(12) United States Patent
Pappa et al.

(10) Patent No.: US 11,882,457 B2
(45) Date of Patent: Jan. 23, 2024

(54) BASEBAND PROCESSING CAPABILITY HANDLING IN SPLIT DEPLOYMENT

(71) Applicant: Telefonaktiebolaget LM Ericsson (publ), Stockholm (SE)

(72) Inventors: Ioanna Pappa, Stockholm (SE); Matteo Fiorani, Solna (SE); Paulson Angelo Vijay Silveris, Stockholm (SE); Tao Cui, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 243 days.

(21) Appl. No.: 17/289,808

(22) PCT Filed: Oct. 25, 2019

(86) PCT No.: PCT/SE2019/051056
§ 371 (c)(1),
(2) Date: Apr. 29, 2021

(87) PCT Pub. No.: WO2020/091657
PCT Pub. Date: May 7, 2020

(65) Prior Publication Data
US 2021/0400495 A1 Dec. 23, 2021

Related U.S. Application Data

(60) Provisional application No. 62/754,914, filed on Nov. 2, 2018.

(51) Int. Cl.
*H04W 4/00* (2018.01)
*H04W 16/02* (2009.01)
*H04W 76/15* (2018.01)

(52) U.S. Cl.
CPC ........... *H04W 16/02* (2013.01); *H04W 76/15* (2018.02)

(58) Field of Classification Search
CPC ...... H04W 16/02; H04W 76/15; H04W 88/06
See application file for complete search history.

(56) References Cited

U.S. PATENT DOCUMENTS

| 9,949,245 B2 * | 4/2018 | Zhang ................... H04L 5/0032 |
| 2014/0308921 A1 * | 10/2014 | Zhang ................... H04W 76/15 |
| | | 455/410 |

(Continued)

FOREIGN PATENT DOCUMENTS

| CN | 107734709 A | 2/2018 |
| CN | 108668381 A | 10/2018 |
| WO | 2018174654 A1 | 9/2018 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.3.0, Dec. 2018, 1-445.

(Continued)

*Primary Examiner* — Shantell L Heiber
(74) *Attorney, Agent, or Firm* — Murphy, Bilak & Homiller, PLLC

(57) ABSTRACT

In a process for adding a base station as a secondary base station, and for example in 5 response to a UE Context Setup Request or a UE Context Modification Request, a distributed unit of a base station selects a feature set, and informs a central unit of the base station of the selected feature set.

13 Claims, 13 Drawing Sheets

(56) References Cited

U.S. PATENT DOCUMENTS

| | | | |
|---|---|---|---|
| 2015/0312913 A1 | 10/2015 | Schmidt et al. | |
| 2016/0344739 A1* | 11/2016 | Xu | H04W 8/06 |
| 2017/0105128 A1* | 4/2017 | Chiba | H04W 48/02 |
| 2018/0279406 A1 | 9/2018 | Agarwal et al. | |
| 2018/0332430 A1* | 11/2018 | Kumar | H04W 4/02 |
| 2019/0069333 A1* | 2/2019 | Kim | H04W 76/15 |

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Ericsson, "RRC version handling", 3GPP TSG RAN WG3 Meeting NR AH 18-07, R3-184104, Montreal, Canada, Jul. 2-6, 2018, 1-76.

ETSI, "5G; NG-RAN; Architecture description", ETSI TS 138 401 V15.3.0, 3GPP TS 38.401 version 15.3.0 Release 15, Sep. 2018, 1-41.

* cited by examiner

BASEBAND PROCESSING CAPABILITY HANDLING IN SPLIT DEPLOYMENT

TECHNICAL FIELD

This relates to a cellular communications network, and in particular to a procedure for adding a secondary node, and handling the baseband processing capability of the secondary node.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the 5th Generation (5G) cellular communications network, a procedure exists such that, when a User Equipment (UE) device has a connection with a master radio access node, or base station, a secondary node, or base station, can be added. It is also possible that a base station can include a central unit and multiple distributed units, which provide the service to the UEs.

In the procedure for adding a secondary node, the master node sends an addition request message to the central unit of the secondary node. The central unit sends a context setup request message to a distributed unit. The distributed unit selects the protocol layer 1 (i.e. the physical layer) and layer 2 (i.e. the Media Access Control) configuration for the UE. The distributed unit then sends the context setup response message to the central unit, with the selected layer 1 and layer 2 configuration. The central unit sends an acknowledge message to the master node. This acknowledge message includes information about the selected band combination.

It is now recognised that a limitation of this is that only the central unit can select the band combination and feature set to be used. The distributed unit is unable to indicate back to the central unit the selected band combination or the feature set under that band combination.

SUMMARY

According to a first aspect of the invention, there is provided a method performed by a distributed unit of a base station. The method comprises, in a process for adding the base station as a secondary base station, selecting a feature set. The method then comprises informing a central unit of said base station of said selected feature set.

The method may comprise selecting the feature set in response to a UE Context Setup Request.

The method may comprise selecting the feature set in response to a UE Context Modification Request.

The method may comprise selecting the feature set in a non-stand-alone secondary base station addition procedure.

The method of any preceding claim, comprising informing the central unit of said base station of said selected feature set in Radio Resource Control information.

The method may comprise informing the central unit of said base station of said selected feature set by means of a feature set index.

The method may comprise receiving from a central unit of said base station an indication of one or more band combination, and selecting a band combination from said indicated one or more band combination.

The method may further comprise receiving from the central unit of said base station an indication of feature sets related to the indicated one or more band combination.

The method may further comprise informing the central unit of said base station of said selected band combination. Specifically, the method may comprise informing the central unit of said base station of said selected band combination by means of a band combination index in Radio Resource Control information.

According to a second aspect of the invention, there is provided a method performed by a central unit of a base station. The method comprises, in a process for adding the base station as a secondary base station, receiving from a distributed unit of said base station information identifying a feature set selected by the distributed unit.

The method may comprise receiving the information identifying the feature set, selected by the distributed unit for future use, in Radio Resource Control information.

The method may comprise receiving the information identifying the feature set by means of a feature set index.

The method may comprise transmitting to the distributed unit an indication of one or more band combination, and transmitting to the distributed unit an indication of feature sets related to the indicated one or more band combination.

The one or more band combination may be a subset of possible band combinations, and the method may comprise selecting the one or more band combination from the possible band combinations.

The method may further comprise receiving from said distributed unit of said base station information identifying a band combination selected by the distributed unit for future use. Specifically, the method may comprise receiving the information identifying the selected band combination by means of a band combination index in Radio Resource Control information.

The methods above may further comprise obtaining user data and forwarding the user data to a host computer or a wireless device.

According to a further aspect of the invention, there is provided a distributed unit of a base station. The distributed unit comprises a processor and a memory. The memory contains program instructions configured to cause the processor to perform a process for adding the base station as a secondary base station. The process comprises selecting a feature set and informing a central unit of said base station of said selected feature set.

According to a further aspect of the invention, there is provided a central unit of a base station. The central unit comprises a processor and a memory. The memory contains program instructions configured to cause the processor to perform a process for adding the base station as a secondary base station. The process comprises receiving from a distributed unit of said base station information identifying a feature set selected by the distributed unit.

According to a first embodiment of the invention, there is provided a method performed by a distributed unit of a base station, the method comprising:

selecting a feature set for future use.

The method may comprise selecting the feature set in a process for adding a secondary base station.

The method may comprise selecting the feature set in a non-stand-alone secondary base station addition procedure.

The may further comprise informing the central unit of said base station of said selected feature set.

The method may comprise informing the central unit of said base station of said selected feature set in Radio Resource Control information.

The method may comprise informing the central unit of said base station of said selected feature set by means of a feature set index.

The method may comprise receiving from a central unit of said base station an indication of one or more band combination.

The method may further comprise receiving from the central unit of said base station an indication of feature sets related to the indicated one or more band combination.

The method may further comprise:

selecting a band combination for future use.

The method may comprise selecting the band combination in said process for adding a secondary base station.

The method may comprise selecting the band combination in a non-stand-alone secondary base station addition procedure.

The method may further comprise informing the central unit of said base station of said selected band combination.

The method may comprise informing the central unit of said base station of said selected band combination in Radio Resource Control information.

The method may comprise informing the central unit of said base station of said selected band combination by means of a band combination index.

According to a further embodiment of the invention, there is provided a method performed by a central unit of a base station, the method comprising:

receiving from a distributed unit of said base station information identifying a feature set selected by the distributed unit for future use.

The method may comprise receiving the information identifying the feature set selected by the distributed unit for future use, in a process for adding a secondary base station.

The method may comprise receiving the information identifying the feature set selected by the distributed unit in a non-stand-alone secondary base station addition procedure.

The method may comprise receiving the information identifying the feature set, selected by the distributed unit for future use, in Radio Resource Control information.

The method may comprise receiving the information identifying the feature set by means of a feature set index.

The method may comprise transmitting to the distributed unit an indication of one or more band combination.

The method may further comprise transmitting to the distributed unit an indication of feature sets related to the indicated one or more band combination.

The method may further comprise:

receiving from said distributed unit of said base station information identifying a band combination selected by the distributed unit for future use.

The method may comprise receiving the information identifying the band combination in said process for adding a secondary base station.

The method may comprise receiving the information identifying the band combination in said non-stand-alone secondary base station addition procedure.

The method may comprise receiving the information identifying the selected band combination in Radio Resource Control information.

The method may comprise receiving the information identifying the selected band combination by means of a band combination index.

The method of these embodiments may further comprise:
obtaining user data; and
forwarding the user data to a host computer or a wireless device.

According to a further embodiment of the invention, there is provided a base station, the base station comprising:
processing circuitry configured to perform any of the steps of any of the previously mentioned embodiments;
power supply circuitry configured to supply power to the base station.

According to a further embodiment of the invention, there is provided a communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the previously mentioned embodiments.

The communication system of the previous embodiment may further include the base station.

The communication system may further including the UE, wherein the UE is configured to communicate with the base station.

In the communication system,
the processing circuitry of the host computer may be configured to execute a host application, thereby providing the user data; and
the UE may comprise processing circuitry configured to execute a client application associated with the host application.

According to a further embodiment of the invention, there is provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the previously mentioned embodiments.

The method may further comprise, at the base station, transmitting the user data.

The user data may be provided at the host computer by executing a host application, the method further comprising, at the UE, executing a client application associated with the host application.

According to a further embodiment of the invention, there is provided a user equipment (UE) configured to communicate with a base station, the UE comprising a radio interface and processing circuitry configured to perform the method of these.

According to a further embodiment of the invention, there is provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the previously mentioned embodiments.

The communication system may further include the base station.

The communication system may further include the UE, wherein the UE is configured to communicate with the base station.

In the communication system:
the processing circuitry of the host computer may be configured to execute a host application;
the UE may be configured to execute a client application associated with the host application, thereby providing the user data to be received by the host computer.

Thus, there are proposed various embodiments which address one or more of the limitations disclosed herein. Specifically, there are disclosed mechanisms that allow the distributed unit to send to the central unit the selected feature set and/or the selected band combination.

This has the advantage that substantial knowledge of the layer 1 capability exists in the distributed unit and not in the central unit, and so the distributed unit can usefully decide the feature set that takes advantage of the baseband processing capability co-ordination. In addition, the distributed unit has knowledge of which the best band combination will be and so, when a selection is possible, it is advantageous that the distributed unit is allowed to select the best band combination according to, for example, current radio conditions, and according to the load.

The embodiments described herein therefore allows the most informed decision to be taken regarding the baseband processing capability co-ordination and the band combination co-ordination.

BRIEF DESCRIPTION OF THE DRAWINGS

For a better understanding of the present invention, and to show how it may be put into effect, reference will now be made, by way of example, to the accompanying drawings, in which:—

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
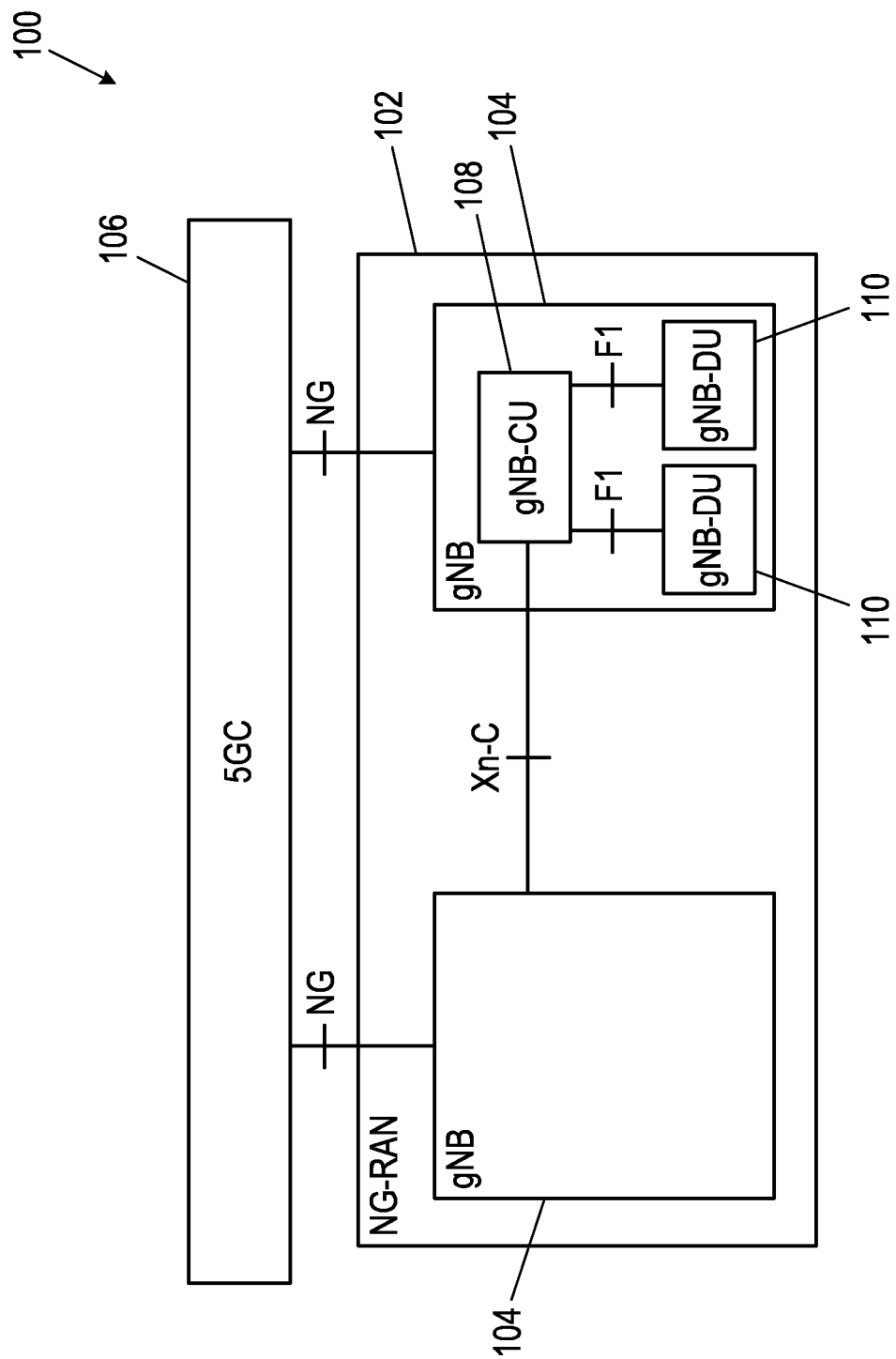
FIG. 1 shows an architecture of a Radio Access Network connected to a Core Network.

FIG. 1 shows a 5G Radio Access Network (RAN) architecture, also referred to as a Next Generation or NG architecture, as described in 3GPP TS38.401 v15.3.0.

The NG architecture 100 comprises a NG-Radio Access Network (RAN) 102, which consists of a set of base stations, gNBs, 104 connected to the 5G Core Network, 5GC, 106 through the NG interface.

A gNB 104 can support Frequency Division Duplex (FDD) mode, Time Division Duplex (TDD) mode or dual mode operation. Two or more gNBs can be interconnected through the Xn interface. A gNB 104 may consist of a central unit (gNB-CU) 108 and distributed units (gNB-DUs) 110. A gNB-CU 108 and a gNB-DU 110 are connected via the F1 logical interface. One gNB-DU 110 is connected to only one gNB-CU 108.

NG, Xn and F1 are logical interfaces. For NG-RAN, the NG and Xn-C interfaces for a gNB 104 consisting of a gNB-CU 108 and gNB-DUs 110, terminate in the gNB-CU 108. For Dual Connectivity, EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all Access and Mobility Function nodes (AMFs) within an AMF Region. The AMF Region is defined in 3GPP TS 23.501.

The general principles for the specification of the F1 interface are as follows:
the F1 interface is open;
the F1 interface supports the exchange of signalling information between the endpoints, in addition the interface shall support data transmission to the respective endpoints;
from a logical standpoint, the F1 is a point-to-point interface between the endpoints (a point-to-point logical interface should be feasible even in the absence of a physical direct connection between the endpoints);

the F1 interface supports control plane and user plane separation;

the F1 interface separates Radio Network Layer and Transport Network Layer;

the F1 interface enables exchanges of UE associated information and non-UE associated information;

the F1 interface is defined to be future proof to fulfil different new requirements, support new services and new functions;

one gNB-CU and set of gNB-DUs are visible to other logical nodes as a gNB. The gNB terminates X2, Xn, NG and S1-U interfaces;

the CU may be separated in control plane (CP) and user plane (UP).

Baseband Processing Capability Co-Ordination

The gNB-CU is currently responsible for the baseband processing capability co-ordination. Taking NR non-standalone (NSA) as an example, the procedure for deciding baseband processing capability in the Secondary gNB (SgNB) addition procedure is now described.

Figure 2:
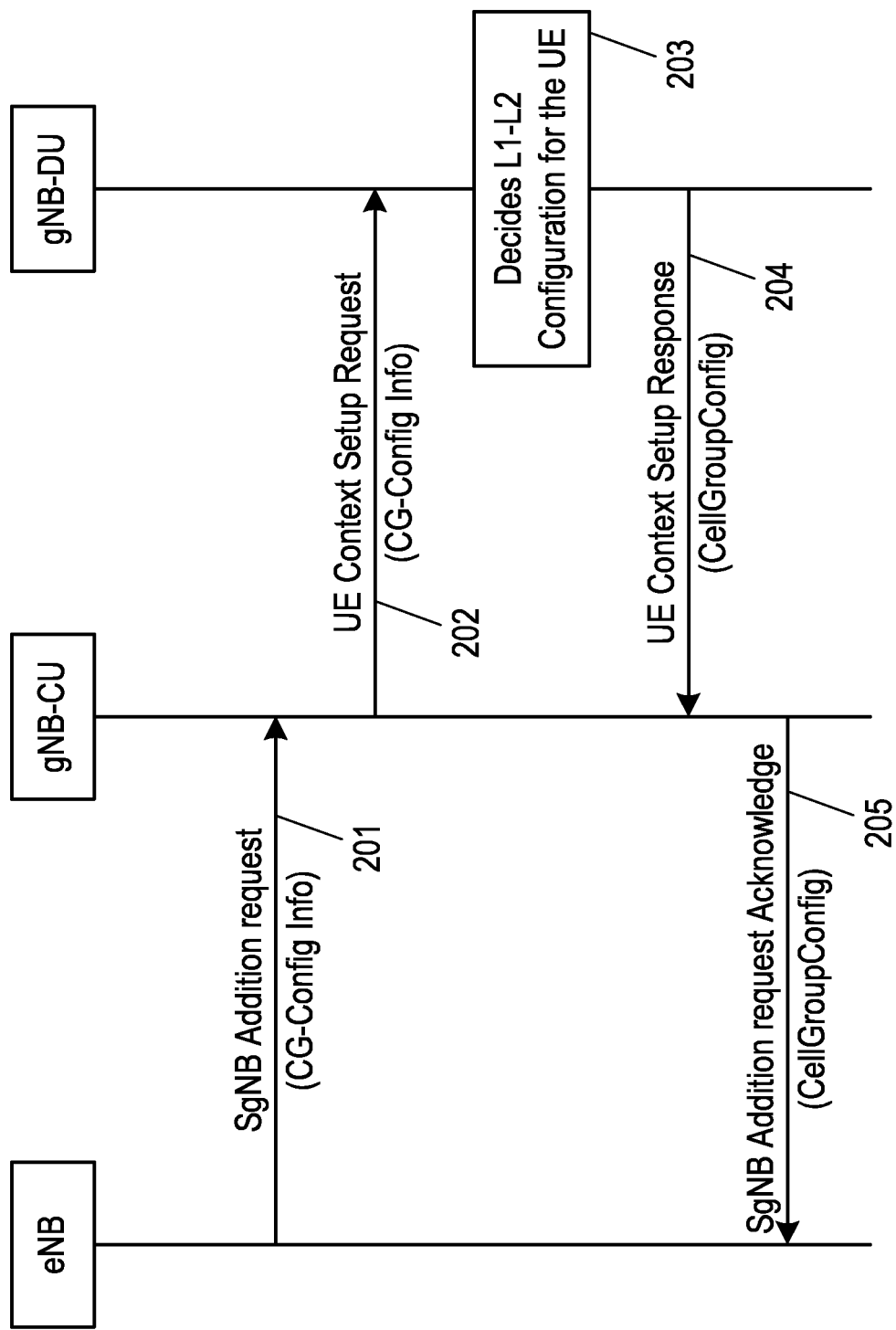
FIG. 2 shows a part of a procedure for adding a secondary node.

Specifically, FIG. 2 shows a part of the SgNB addition procedure in NSA.

At step 201, the eNB, i.e. the master node, sends the X2 SgNB Addition Request message to the gNB-CU including the CG-ConfigInfo RRC container. The CG-ConfigInfo RRC container includes the allowedBC-ListMRDC, which contains the band combinations and the associated feature set that can be selected. The gNB-CU also transfers the UE Capability container to the gNB-DU to aid the gNB-DU in preparing the Secondary Cell Group (SCG) configuration as per the capabilities of the UE.

At step 202, the gNB-CU sends to the gNB-DU the F1 UE Context Setup Request message, including the CG-ConfigInfo RRC container.

At step 203, the gNB-DU, based on the information in the CG-ConfigInfo RRC container, selects the Layer 1 (i.e. the physical layer, PHY) and Layer 2 (i.e. the Media Access Control MAC), together referred to as L1-L2, configuration for the UE.

At step 204, the gNB-DU sends the F1 UE Context Setup Response message, including the CellGroupConfig RRC container (with the selected L1-L2 configuration).

At step 205, the gNB-CU sends the X2 SGNB Addition Request Acknowledge message to the eNB including the CellGroupConfig RRC container. The CellGroupConfig RRC container includes the SelectedBandCombinationBR.

Conventionally, the band combination and the feature set are selected by the gNB-CU. However, as discussed above, there may be advantages in the feature set, and possibly also the band combination, being selected by the gNB-DU.

Figure 3:
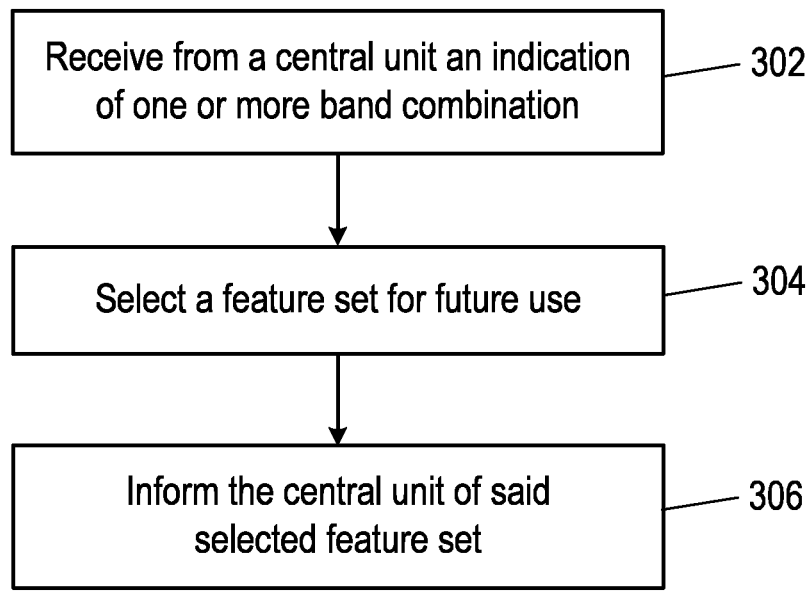
FIG. 3 is a flow chart, illustrating a first method in accordance with one aspect of the invention.

FIG. 3 is a flow chart, illustrating a procedure performed by the distributed unit of a base station, gNB-DU, 110 in the architecture of FIG. 1. More specifically, the procedure shown in FIG. 3 may be performed as part of a process for adding a secondary base station. More specifically, the procedure shown may be performed by the distributed unit of the secondary base station being added.

Specifically, at step 302, the distributed unit receives an indication of one or more band combination. The band combination or, when there is more than one band combination, each band combination may have one or more associated feature set. In some embodiments, the indication is received in a UE Context Setup Request message. In other embodiments, the indication is received in a UE Context Modification Request.

Then, at step 304, the distributed unit selects a feature set for future use. As is known, the feature set indicates the baseband processing capability, and includes features such as the bandwidth, subcarrier spacing, modulation and MIMO layers.

At step 306, the distributed unit informs the central unit of the selected feature set.

Figure 4:
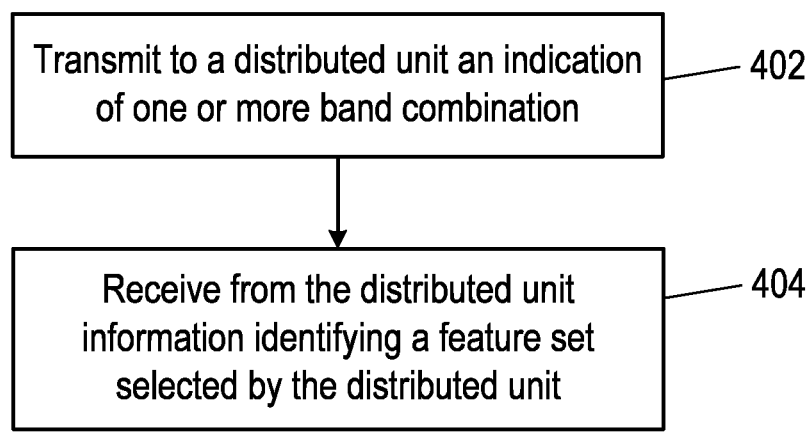
FIG. 4 is a flow chart, illustrating a second method in accordance with another aspect of the invention.

FIG. 4 is a flow chart, illustrating a corresponding procedure performed by the central unit of a base station, gNB-CU, 108 in the architecture of FIG. 1. More specifically, the procedure shown in FIG. 4 may be performed as part of a process for adding a secondary base station. More specifically, the procedure shown may be performed by the central unit of the secondary base station being added.

Specifically, at step 402, the central unit transmits to the distributed unit an indication of one or more band combination. As mentioned above, in some embodiments, the indication is sent in a UE Context Setup Request message. In other embodiments, the indication is sent in a UE Context Modification Request.

By way of example, this table shows the form of a band combination and associated feature sets.

| 1A | 3A | 5A | 7A | 7A | N78A |
|---|---|---|---|---|---|
| FSET-EUTRA[0] | FSET-EUTRA[0] | FSET-EUTRA[0] | FSET-EUTRA[0] | FSET-EUTRA[0] | FSET-NR[0] |
| FSET-EUTRA[1] | FSET-EUTRA[1] | FSET-EUTRA[1] | FSET-EUTRA[1] | FSET-EUTRA[1] | FSET-NR[1] |
| FSET-EUTRA[2] | FSET-EUTRA[2] | FSET-EUTRA[2] | FSET-EUTRA[2] | FSET-EUTRA[2] | FSET-NR[2] |
| FSET-EUTRA[3] | FSET-EUTRA[3] | FSET-EUTRA[3] | FSET-EUTRA[3] | FSET-EUTRA[3] | FSET-NR[4] |

Thus, in this example, the band combination contains 1, 3, 5, 7 and n78 bands. Each row of the table shows a respective feature set associated with the band combination. The CU may notify the DU of one or more such band combinations, each including one or more associated feature sets.

Where the CU notifies the DU of multiple band combinations, the DU selects a band combination, and notifies the CU of the selected band combination be sending to the CU the index number of the selected band combination.

Where the CU notifies the DU of one band combination or multiple band combinations, in either case the DU selects the feature set that is set out in one of the rows of the relevant table, and notifies the CU of the selected feature set by sending to the CU the index number of the row.

Thus, at step 404, the central unit is informed by the distributed unit of the feature set selected by the distributed unit. It is advantageous for the central unit to know the selected band combination and feature set, for the purposes of UE capability coordination with the Master eNB (MeNB). Therefore, in this embodiment, the gNB-DU has the possibility of indicating the selected feature set and, where appropriate, the selected band combination for the Secondary Cell Group (SCG) configuration.

In one embodiment of the procedures shown in FIGS. 3 and 4, the gNB-CU does the band combination selection and the gNB-DU does the feature set selection.

MIMO layers when the throughput is the same for the combinations given by the gNB-CU.

In these embodiments, as shown at step 306 of FIG. 3, the gNB-DU informs the gNB-CU of the selected feature set.

This is preferably done by providing notification in the DU to CU RRC Information.

The form of the DU to CU RRC Information is shown in the following table:

| IE/Group Name | Presence | Range | IE type and reference | Semantics description |
|---|---|---|---|---|
| CellGroupConfig | M | | OCTET STRING | CellGroupConfig, as defined in TS 38.331. |
| MeasGapConfig | O | | OCTET STRING | MeasGapConfig as defined in TS 38.331. For EN-DC operation, includes the gap for FR2, as requested by the gNB-CU via MeasConfig IE. For NG-RAN, includes the gap(s) for FR1 and/or FR2, as requested by the gNB-CU via MeasConfig IE and according to the requested gap type (per-UE or per-FR). |
| Requested P-MaxFR1 | O | | OCTET STRING | RequestedP-MaxFR1, as defined in TS 38.331. For EN-DC operation, this IE should be included, as requested by the gNB-CU via CG-ConfigInfo IE. |
| Selected BandCombinationIndex | O | | OCTET STRING | BandCombinationIndex, as defined in TS 38.331. For EN-DC operation, this IE should be included so that gNB-CU is informed of the selected Band Combination. |
| Selected FeatureSetEntryIndex | O | | OCTET STRING | FeatureSetEntryIndex, as defined in TS 38.331. For EN-DC operation, this IE should be included so that gNB-CU is informed of the selected FeatureSet. |

The number of capabilities present in the NR feature set is high and this number may increase with future releases. Because of that, there may be a disadvantage, as well as advantages, in pushing all the capabilities between the gNB-CU and the gNB-DU, to decide the NR featureset to be used for the Carrier aggregation.

Thus, in this embodiment, the gNB-DU should do the feature set selection, but it should know which band combination to target.

In the prior art, the entire allowedBC-ListMRDC is passed to the gNB-DU. However, in this embodiment, the gNB-CU has the opportunity to modify the allowedBC-ListMRDC to send only one or more specific band combination and the related feature sets to the gNB-DU.

In another embodiment of the procedures shown in FIGS. 3 and 4, the gNB-DU does both the band combination selection and the feature set selection. Sometimes, it is important to do an effective bandwidth evaluation between two different combinations to select the one which gives the best throughput. The necessary IEs for the peak rate throughput calculation are present in the feature set. The gNB-DU can select a combination which can maximize the throughput or can prioritize between a number of carriers or In the embodiment where the gNB-DU does both the band combination selection and the feature set selection, both the Selected BandCombinationIndex and Selected FeatureSetEntryIndex should be included in the DU to CU RRC Information that is sent in step 306 of the procedure shown in FIG. 3.

However, in the embodiment where the gNB-DU only does the feature set selection, it is sufficient to include only the Selected FeatureSetEntryIndex in the DU to CU RRC Information. This IE should be optional, since it is optional in the X2 interface. Also, when it comes to SA, for the case of single carrier, the band combination and baseband processing capability co-ordination is not needed.

Thus, the gNB-DU has the possibility to explicitly indicate the selected band combination entry, where necessary, together with the feature set entry in the UE context setup response.

Figure 5:
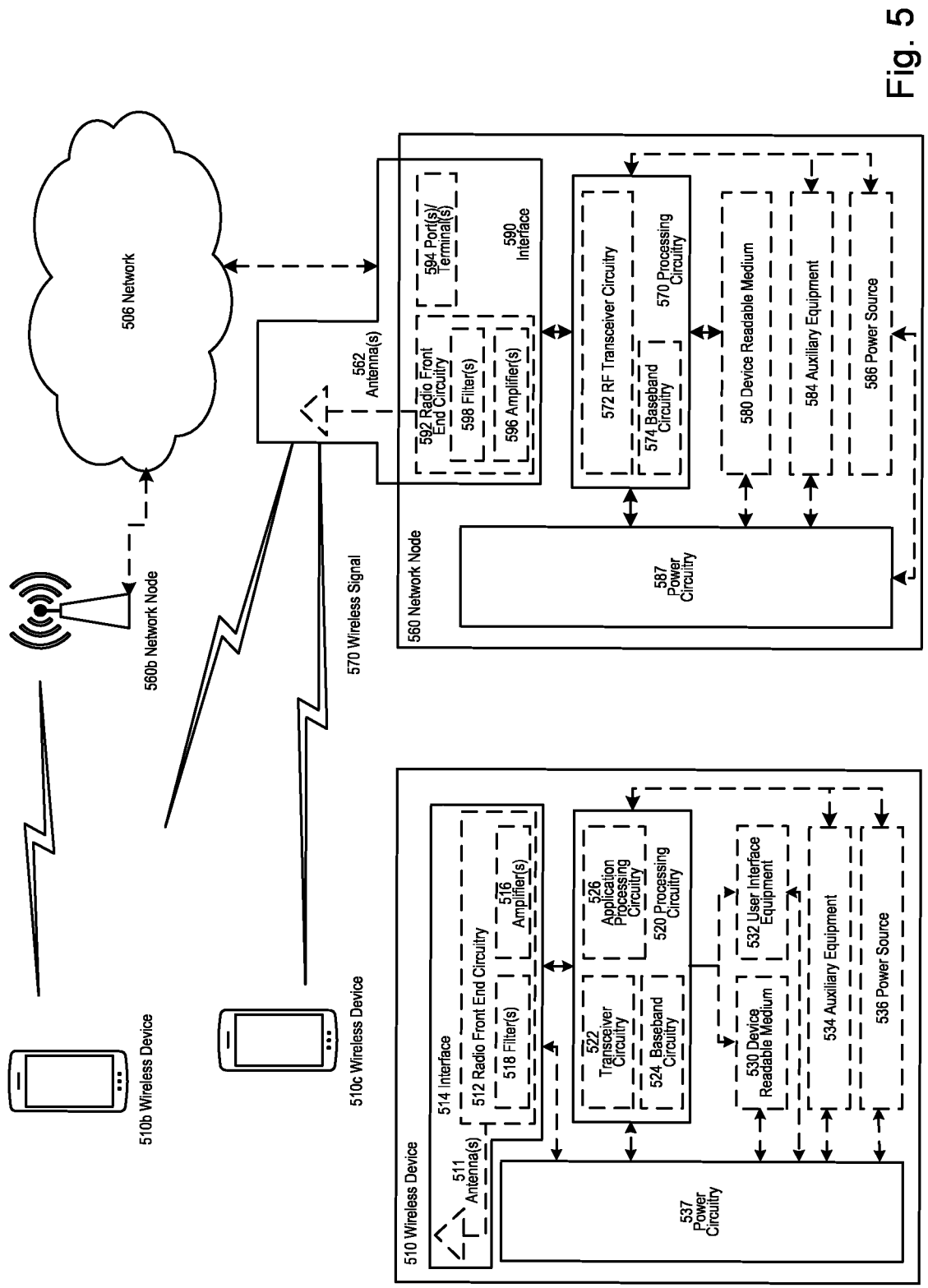
FIG. 5 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c.

In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

In particular, the network node 560 may be in the form of a gNB that comprises a central unit and at least one distributed unit, with the base station functionality being divided between the central unit and the at least one distributed unit.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination. Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units.

In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components. In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment. Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination. Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated. User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario. Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
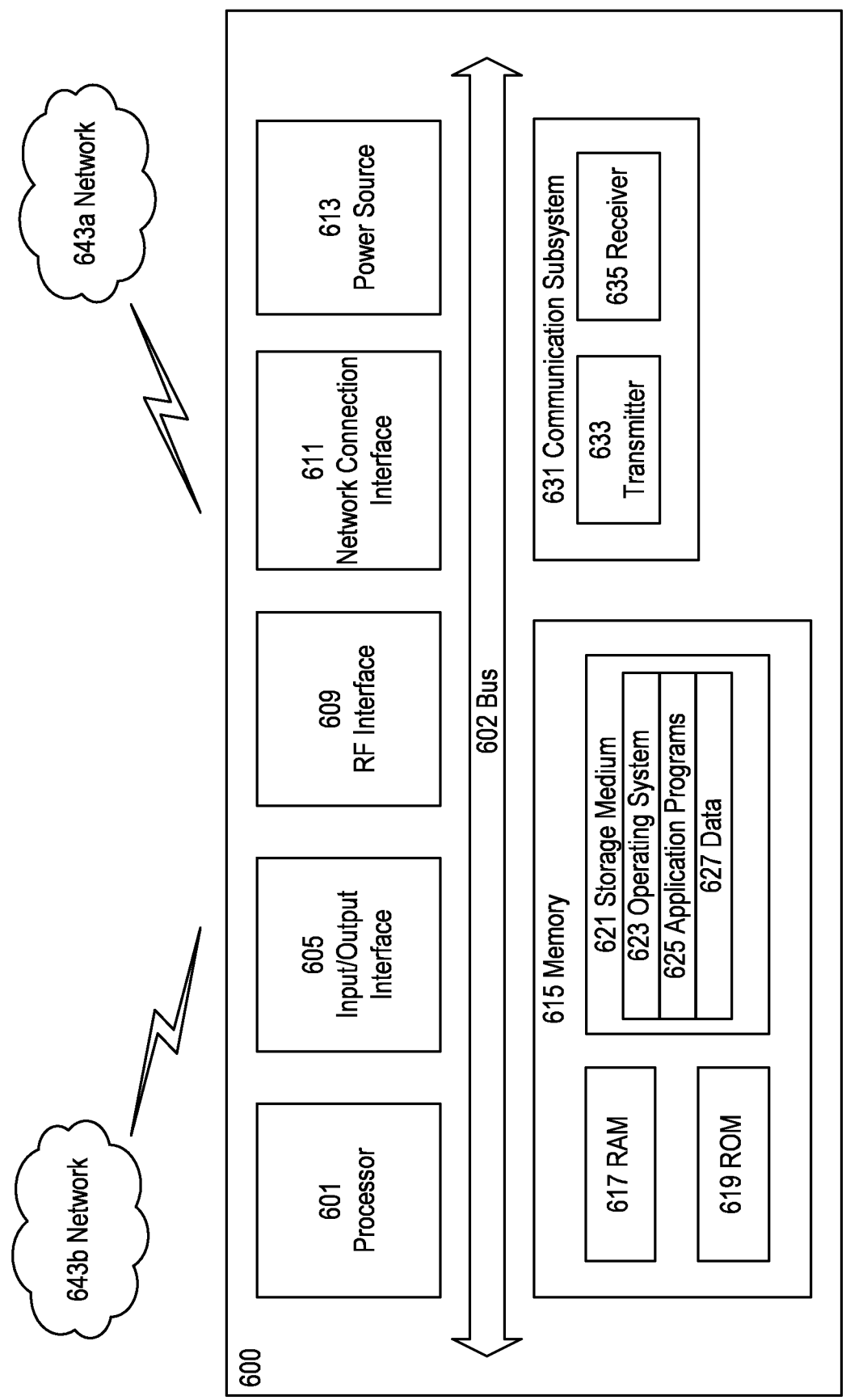
FIG. 6 shows a User Equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the 3rd Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa. In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium. In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600. The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
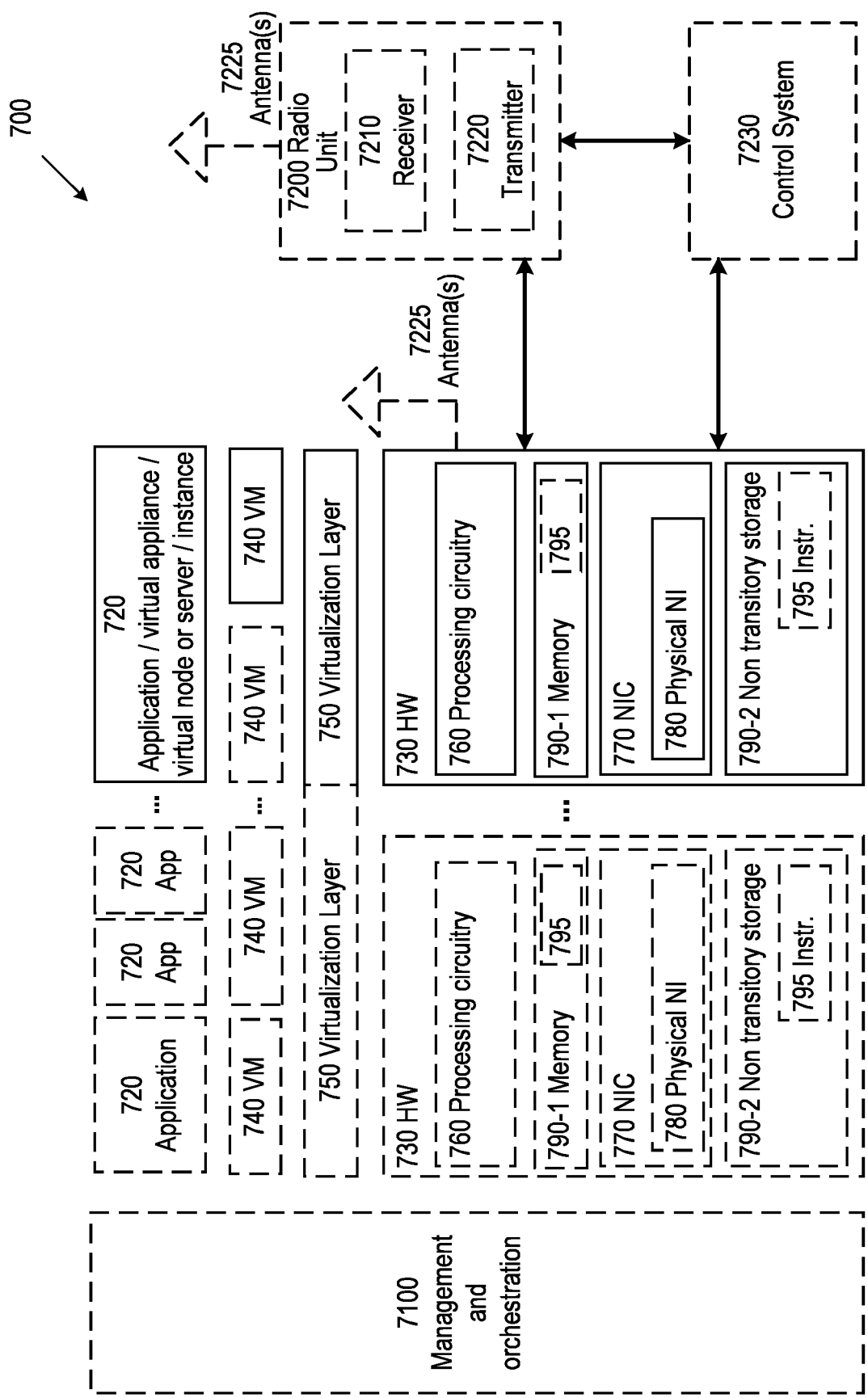
FIG. 7 shows a virtualization environment in accordance with some embodiments.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment. In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7. In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
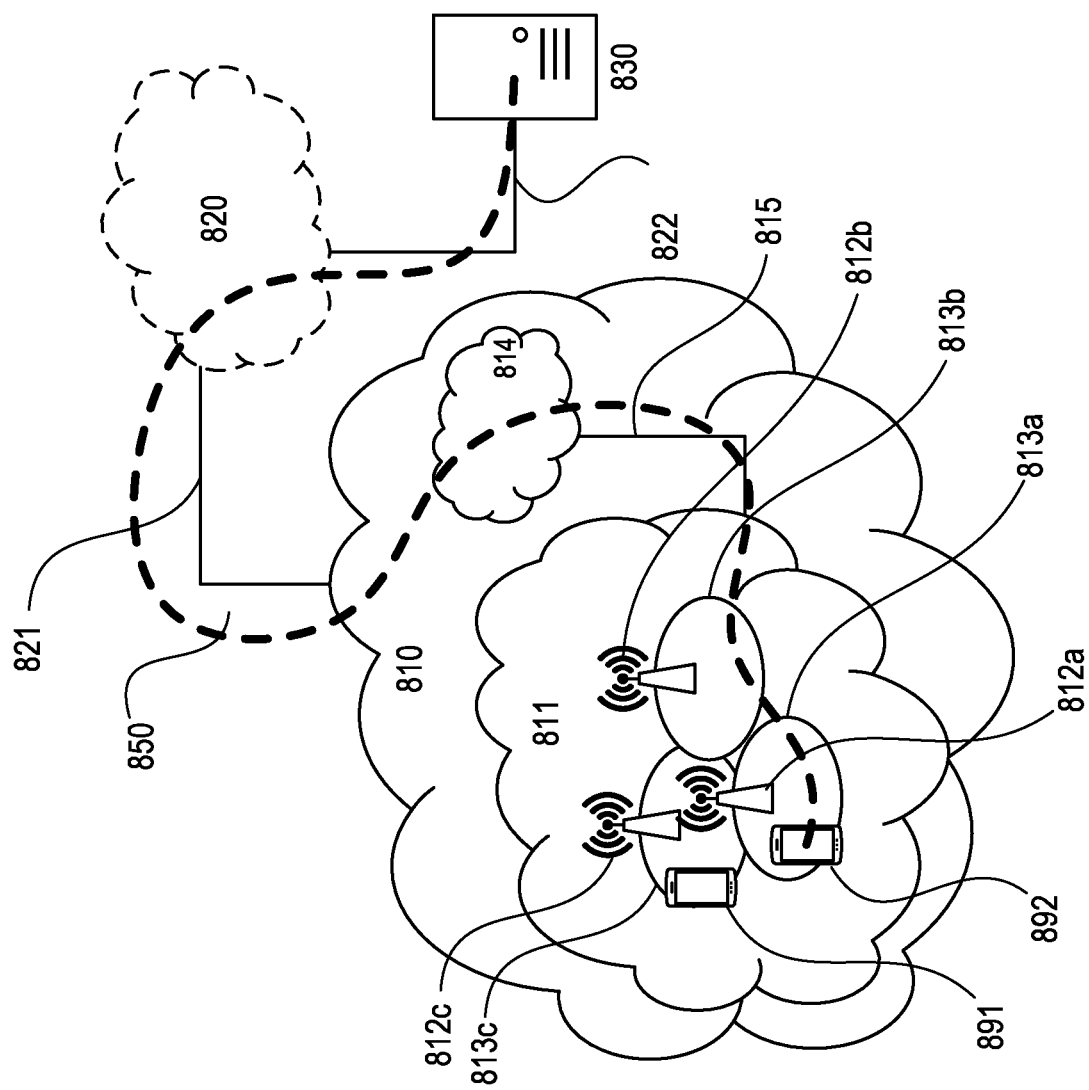
FIG. 8 shows a telecommunication network connected via an intermediate network to a host computer in accordance with some embodiments.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812. Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
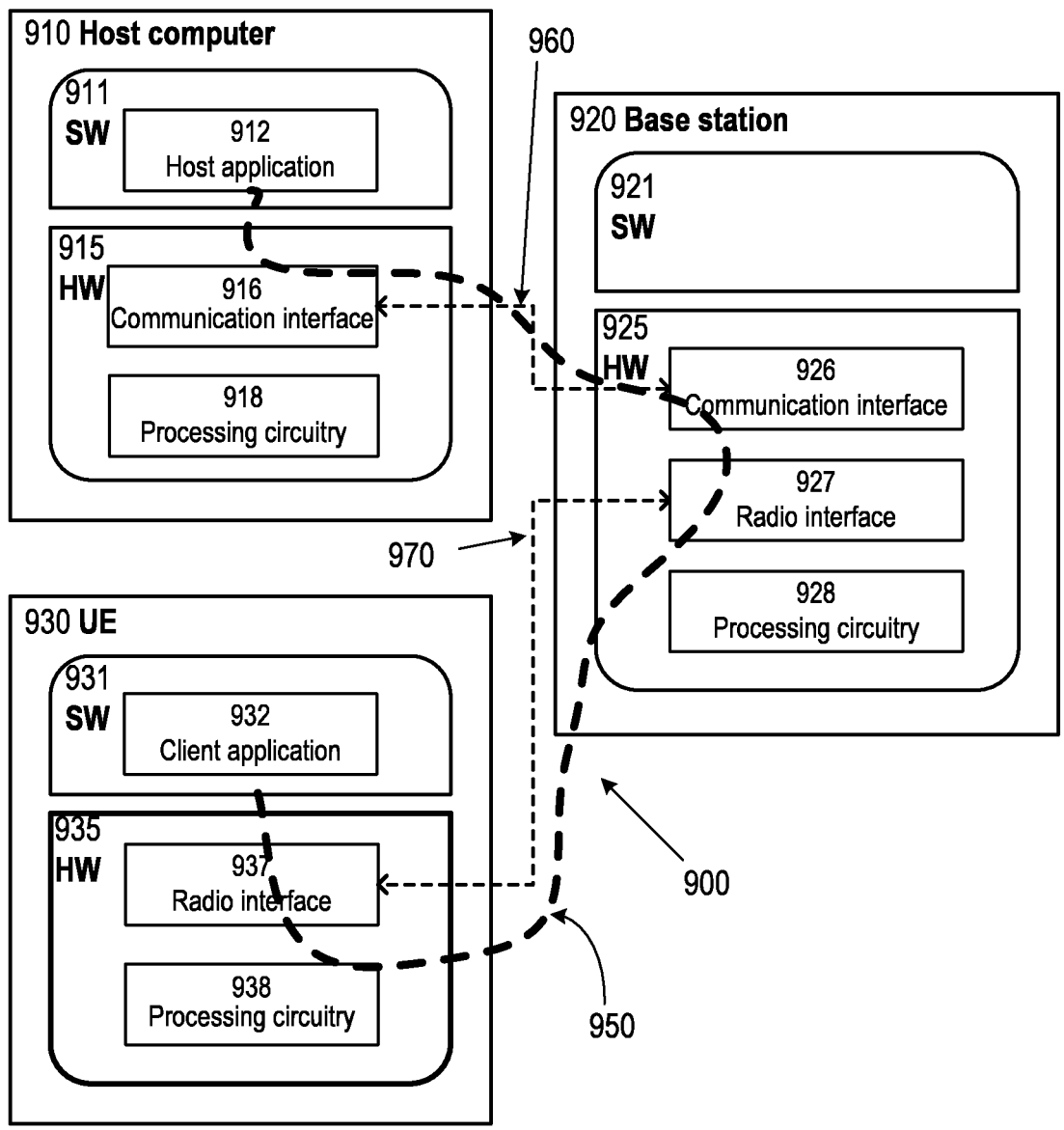
FIG. 9 shows a host computer communicating via a base station with a user equipment over a partially wireless connection in accordance with some embodiments.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the data rate that is achievable, and thereby provide benefits such as reduced user waiting time. A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
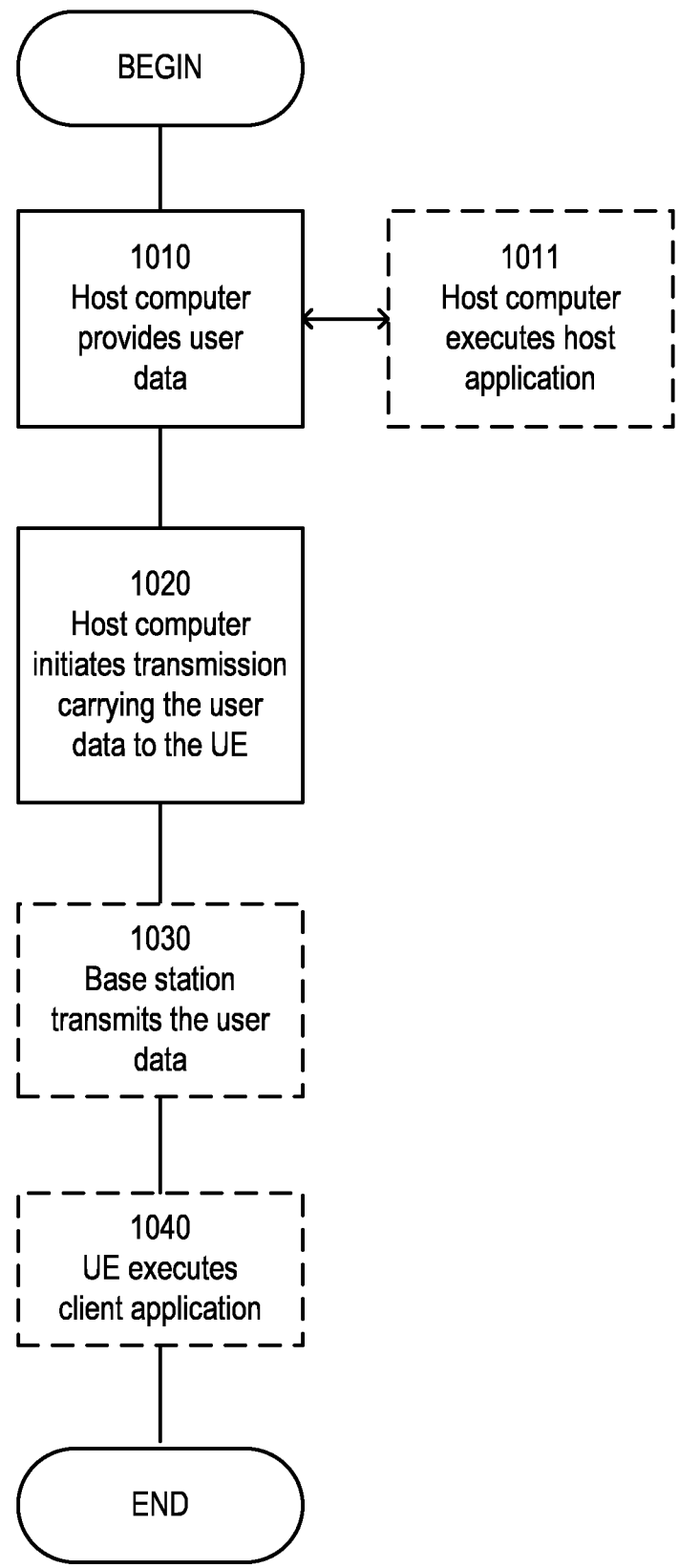
FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
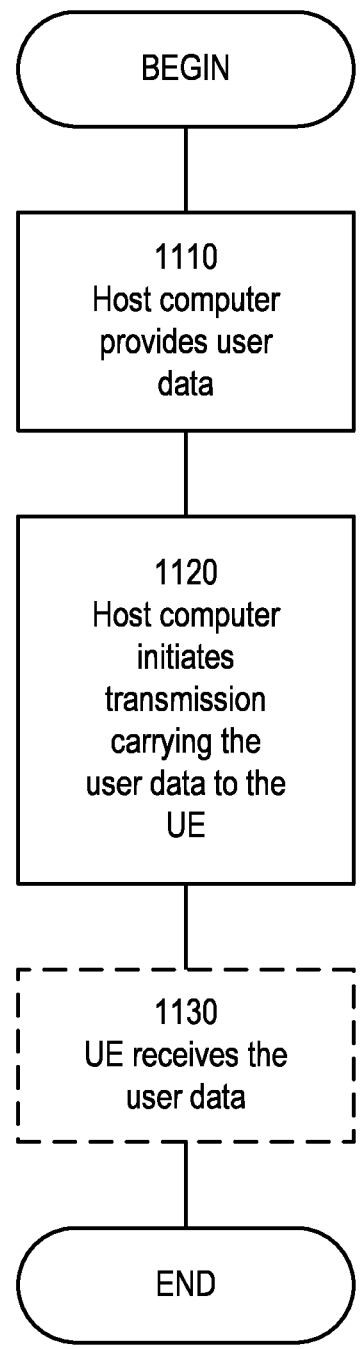
FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
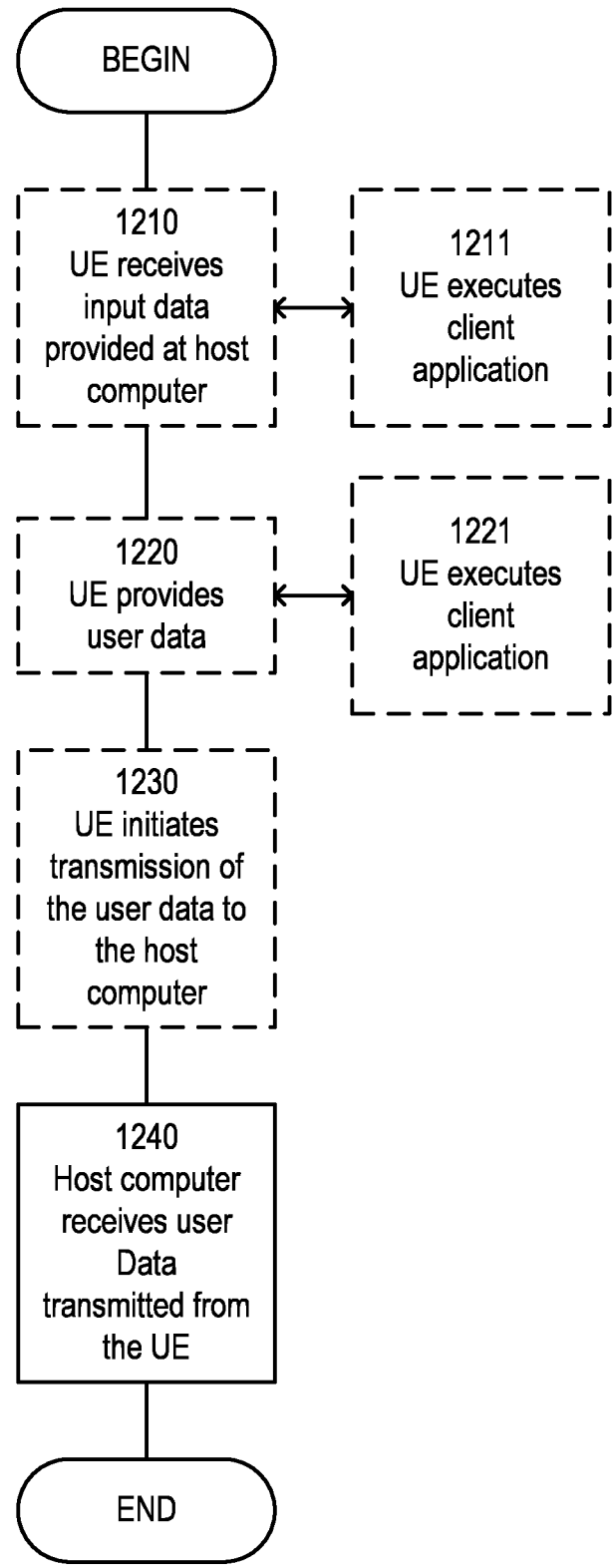
FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
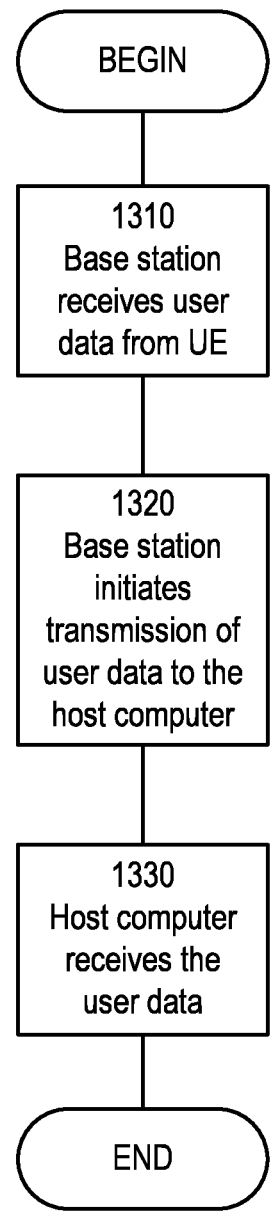
FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
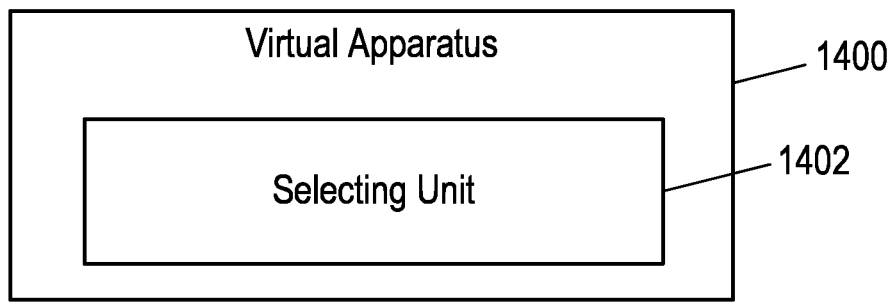
FIG. 14 shows a virtualization apparatus in accordance with some embodiments.

FIG. 14 illustrates a schematic block diagram of an apparatus 1400 in a wireless network (for example, the wireless network shown in FIG. 5). The apparatus may be implemented in a wireless device or network node (e.g., wireless device 510 or network node 560 shown in FIG. 5). Apparatus 1400 is operable to carry out the example method described with reference to FIG. 3 and possibly any other processes or methods disclosed herein. It is also to be understood that the method of FIG. 3 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause selecting unit 1402, and any other suitable units of apparatus 1400 to perform corresponding functions according one or more embodiments of the present disclosure.

As illustrated in FIG. 14, apparatus 1400 includes selecting unit 1402, for, in a distributed unit of a base station, selecting a feature set for future use.

Figure 15:
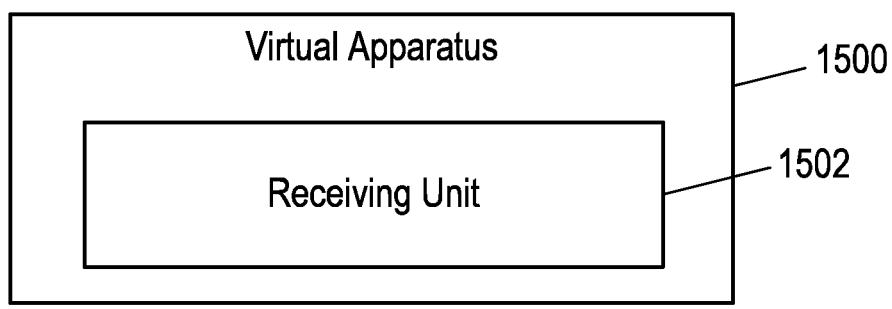
FIG. 15 shows a virtualization apparatus in accordance with some embodiments.

FIG. 15 illustrates a schematic block diagram of an apparatus 1500 in a wireless network (for example, the wireless network shown in FIG. 5). The apparatus may be implemented in a wireless device or network node (e.g., wireless device 510 or network node 560 shown in FIG. 5). Apparatus 1500 is operable to carry out the example method described with reference to FIG. 4 and possibly any other processes or methods disclosed herein. It is also to be understood that the method of FIG. 4 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, and any other suitable units of apparatus 1500 to perform corresponding functions according one or more embodiments of the present disclosure.

As illustrated in FIG. 15, apparatus 1500 includes receiving unit 1502 for, in a central unit of a base station, receiving from a distributed unit of said base station information identifying a feature set selected by the distributed unit for future use.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network WCDMA Wide CDMA
WLAN Wide Local Area Network

The invention claimed is:

1. A method performed by a distributed unit of a base station for adding the base station as a secondary base station to a wireless device connected to a master base station, the method comprising:
   receiving, from a central unit of the base station, an indication of one or more band combinations, each band combination having one or more associated feature sets;
   selecting a band combination from the one or more band combinations;
   selecting a feature set from the one or more associated feature sets of the selected band combination, in dependence on baseband processing capabilities of the base station; and
   informing, the central unit of said base station, of:
      a band combination index indicative of said selected band combination; and
      a feature set index indicative of said selected feature set.

2. The method of claim 1, comprising selecting the band combination and the feature set in response to a UE Context Setup Request.

3. The method of claim 2, comprising selecting the band combination and the feature set in a non-stand-alone secondary base station addition procedure.

4. The method of claim 1, comprising selecting the band combination and the feature set in response to a UE Context Modification Request.

5. The method of claim 1, comprising informing the central unit of said base station of said selected feature set in Radio Resource Control information.

6. The method of claim 1, comprising informing the central unit of said base station of said selected band combination by means of a band combination index in Radio Resource Control information.

7. A method performed by a central unit of a base station for adding the base station as a secondary base station to a wireless device connected to a master base station, the method comprising:
   transmitting, to a distributed unit of the base station, an indication of one or more band combinations, each band combination having one or more associated feature sets;
   receiving, from the distributed unit of said base station,
      a band combination index indicative of a band combination selected by the distributed unit, and
      a feature set index indicative of a feature set selected by the distributed unit.

8. The method of claim 7, comprising receiving the feature set index selected by the distributed unit for future use in Radio Resource Control information.

9. The method of claim 7, wherein the one or more band combinations are a subset of possible band combinations, and the method comprises selecting the one or more band combinations from the possible band combinations.

10. The method of claim 7, comprising receiving the band combination index in Radio Resource Control information.

11. The method of claim 7, further comprising:
    obtaining user data; and
    forwarding the user data to a host computer or a wireless device.

12. A distributed unit of a base station, comprising:
    a processor; and
    a memory,
    wherein the memory contains program instructions configured to cause the processor to perform a process for adding the base station as a secondary base station to a wireless device connected to a master base station, wherein the process comprises:
       receiving, from a central unit of the base station, an indication of one or more band combinations, each band combination having one or more associated feature sets;
       selecting a band combination from the one or more band combinations;
       selecting a feature set from the one or more associated feature sets of the selected band combination, in dependence on baseband processing capabilities of the base station; and
       informing, the central unit of said base station, of:
          a band combination index indicative of said selected band combination; and
          a feature set index indicative of said selected feature set.

13. A central unit of a base station, comprising:
    a processor; and
    a memory,
    wherein the memory contains program instructions configured to cause the processor to perform a process for adding the base station as a secondary base station to a wireless device connected to a master base station, wherein the process comprises:
       transmitting, to a distributed unit of the base station, an indication of one or more band combinations, each band combination having one or more associated feature sets;
       receiving, from the distributed unit of said base station,
          a band combination index indicative of a band combination selected by the distributed unit, and
          a feature set index indicative of a feature set selected by the distributed unit.

* * * * *